(12) United States Patent
Laigle et al.

(10) Patent No.: US 11,441,464 B2
(45) Date of Patent: Sep. 13, 2022

(54) USE OF OZONE WITH LNT AND $MNO_2$ CATALYST FOR THE TREATMENT OF RESIDUAL POLLUTANT FOR THE EXHAUST GAS OF AN INTERNAL ENGINE COMBUSTION

(71) Applicant: SAUDI ARABIAN OIL COMPANY, Dhahran (SA)

(72) Inventors: Emmanuel Laigle, Courbevoie (FR); Christophe Chaillou, Rueil-Malmaison (FR); Caroline Norsic, Rueil-Malmaison (FR); André Nicolle, Nanterre (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/165,343

(22) Filed: Feb. 2, 2021

(65) Prior Publication Data
US 2022/0243626 A1 Aug. 4, 2022

(51) Int. Cl.
*F01N 3/20* (2006.01)
*F01N 9/00* (2006.01)
(Continued)

(52) U.S. Cl.
CPC .......... *F01N 3/206* (2013.01); *B01D 53/8625* (2013.01); *F01N 3/106* (2013.01);
(Continued)

(58) Field of Classification Search
CPC ............... F01N 2240/38; B01D 2251/104
See application file for complete search history.

(56) References Cited

U.S. PATENT DOCUMENTS 6,068,824 A 5/2000 Kinoshita et al.
7,998,445 B2 8/2011 Jurng et al.
(Continued)

FOREIGN PATENT DOCUMENTS

EP 1216746 A2 6/2002
EP 2112340 A1 * 10/2009 ........... F01N 13/009
(Continued)

OTHER PUBLICATIONS

Machine translation of FR-2885953-A1, accessed Feb. 2, 2022. (Year: 2022).*
(Continued)

*Primary Examiner* — Jonathan R Matthias
(74) *Attorney, Agent, or Firm* — Osha Bergman Watanabe & Burton LLP

(57) ABSTRACT

Systems for reducing the content of residual pollutants from tailpipes emissions in an exhaust line having a cold part may include an ozone generation system; an $MnO_2$ catalyst; and a lean $NO_x$ trap (LNT) catalyst. In these systems, the ozone, $MnO_2$ catalyst, and LNT catalyst may be provided in the cold part of the exhaust line. In these systems, the residuals pollutants may be oxidized at temperatures of from about 20° C. to about 150° C. in rich or lean conditions and $NO_2$ may have a concentration of less than 0.1 mg/km in the tailpipe emissions downstream of the cold part of the exhaust line. Corresponding methods may include generating ozone from an ozonizer; injecting the ozone in a mixing chamber comprising the residual pollutants to form a first mixture; converting the first mixture using an $MnO_2$ catalyst to form a second mixture; and converting the second mixture using an LNT catalyst.

12 Claims, 2 Drawing Sheets

(51) Int. Cl.
    *B01D 53/86*    (2006.01)
    *F01N 3/10*    (2006.01)

(52) U.S. Cl.
    CPC ............ *F01N 9/00* (2013.01); *B01D 53/8628* (2013.01); *B01D 2251/104* (2013.01); *B01D 2255/102* (2013.01); *B01D 2255/2042* (2013.01); *F01N 2240/38* (2013.01); *F01N 2370/02* (2013.01); *F01N 2560/026* (2013.01); *F01N 2610/06* (2013.01)

(56) References Cited

U.S. PATENT DOCUMENTS

| | | |
|---|---|---|
| 2018/0171850 A1 | 6/2018 | Aydin et al. |
| 2020/0078768 A1* | 3/2020 | Patchett ................ B01J 37/088 |

FOREIGN PATENT DOCUMENTS

| | | | | |
|---|---|---|---|---|
| FR | 2885953 | A1 * | 11/2006 | ........... F01N 3/0892 |
| JP | H03229619 | A | 10/1991 | |
| JP | H03275126 | A | 12/1991 | |
| JP | H05192535 | A | 8/1993 | |
| JP | H0655032 | A | 3/1994 | |
| JP | 2008190438 | A * | 8/2008 | ............ B60K 6/445 |
| JP | 2019055885 | A | 4/2019 | |
| JP | 2019127833 | A | 8/2019 | |
| JP | 2019127834 | A | 8/2019 | |
| KR | 100488398 | B1 | 5/2005 | |
| WO | 2020083099 | A1 | 4/2020 | |

OTHER PUBLICATIONS

International Search Report and Written Opinion issued in corresponding PCT International Application No. PCT/US2022/014869 dated Apr. 19, 2022 (13 pages).

* cited by examiner

USE OF OZONE WITH LNT AND MNO$_2$ CATALYST FOR THE TREATMENT OF RESIDUAL POLLUTANT FOR THE EXHAUST GAS OF AN INTERNAL ENGINE COMBUSTION

BACKGROUND

Environmental concerns and government regulations have led to efforts to improve the removal of noxious combustion by-products and exhaust pollutants from vehicle engine exhaust gases. Thus, reduction of these exhaust pollutants from exhaust gases is desirable. These exhaust gases generally contain several components including carbon monoxide (CO), unburned hydrocarbons or nitrogen oxides (NO$_x$). Exhaust lines commonly incorporate several components in order to reduce pollutants from a high concentration of such pollutants at the engine level to lower concentrations at the tailpipe. For example, one or more catalysts may be included to treat gaseous pollutants such as CO, unburned hydrocarbons, or NO$_x$. Additionally, particulate filters may be introduced to store solid pollutants, also known as soots or particulate matter.

However, a large part of the total NO$_x$, CO, and hydrocarbon emissions are emitted during the cold start phase because most emission control catalysts reach a high level of pollutant conversion at their operationally warm state. As such, catalysts are often heated during the cold start phase to increase pollutant conversion and reduce emissions during that phase in order for them to reach the operating temperatures required for conversion of the hydrocarbons. However, under cold start conditions, residual pollutants may remain. Accordingly, the removal of residual pollutants under cold start conditions is highly desirable.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, embodiments disclosed herein are directed to systems for reducing the content of residual pollutants including NO, CO, and hydrocarbons from tailpipes emissions in an exhaust line having a cold part. The systems may include an ozone generation system; an MnO$_2$ catalyst; and a lean NO$_x$ trap (LNT) catalyst. In these systems, the ozone, MnO$_2$ catalyst, and LNT catalyst may be provided in the cold part of the exhaust line. Further, these systems may be such that the residuals pollutants may be oxidized at temperatures of from about 20° C. to about 150° C. in rich or lean conditions and NO$_2$ may have a concentration of less than 0.1 mg/km in the tailpipe emissions downstream of the cold part of the exhaust line.

In another aspect, embodiments disclosed herein are directed to methods of treating residual pollutants comprising NO, CO, and hydrocarbons from tailpipes emissions in an exhaust line having a cold part. These methods may include the steps of generating ozone from an ozonizer; injecting the ozone in a mixing chamber comprising the residual pollutants to form a first mixture; converting the first mixture using an MnO$_2$ catalyst to form a second mixture; and converting the second mixture using an LNT catalyst. In these methods, the ozone, MnO$_2$ catalyst, and LNT catalyst may be provided in the cold part of the exhaust line. Further, in these methods, the residuals pollutants may be oxidized at temperatures of from about 20° C. to about 150° C. in rich or lean conditions; and NO$_2$ may have a concentration of less than 0.1 mg/km in the tailpipe emissions downstream of the cold part of the exhaust line.

Other aspects and advantages of this disclosure will be apparent from the following description made with reference to the appended claims.

DETAILED DESCRIPTION

Embodiments in accordance with the present disclosure generally relate to systems and methods for reducing the content of residual pollutants comprising NO, CO, and hydrocarbons (C$_x$H$_y$) from tailpipes emissions in an exhaust line having a cold part.

In particular, the catalytic emission control of pollutants during the cold start phase is limited by the operating temperature of the catalysts. Accordingly, the reduction of residual pollutants from an exhaust gas during the cold start phase is highly desirable.

Figure 1:
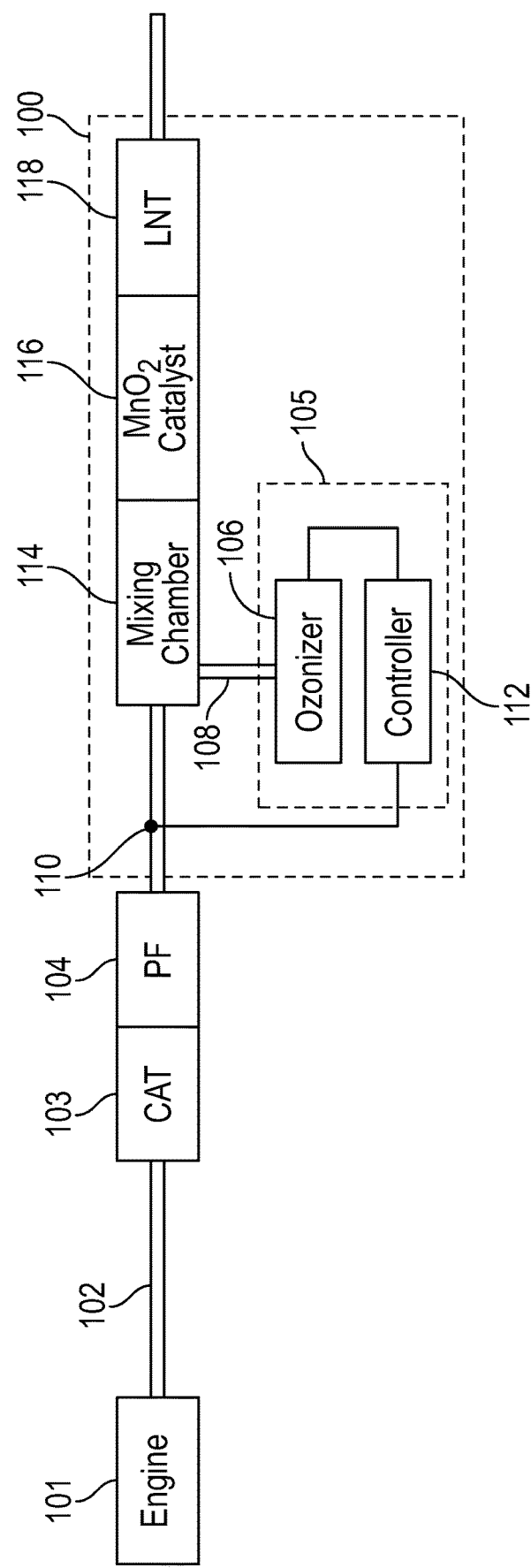
FIG. 1 is a schematic diagram of a system for reducing the content of residual pollutants comprising NO, CO, and hydrocarbons from tailpipes emissions in an exhaust line having a cold part in accordance with one or more embodiments.

Hence, there is a need for systems and methods that may provide reduction of residual pollutants from an exhaust gas during the cold start phase without the need to heat the catalysts used therein. The present disclosure relates to systems for reducing the content of residual pollutants comprising NO, CO, and hydrocarbons from tailpipes emissions in an exhaust line having a cold part. As illustrated in FIG. 1, an exemplary system 100 according to the present disclosure may be placed on an exhaust line 102 downstream of an engine 101. The system 100 includes a catalyst 103 reducing gaseous pollutants, and a particulate filter 104 storing solid pollutants from the tailpipes emissions. The system 100 may include an ozone generation system 105, an MnO$_2$ catalyst 116, and a lean NO$_x$ trap (LNT) catalyst 118.

In the systems of the present disclosure, the ozone (O$_3$), MnO$_2$ catalyst, and LNT catalyst may be located in the cold part of the exhaust line and the residuals pollutants are oxidized at temperatures of from about 20° C. to about 150° C., or from about 25° C. to about 100° C., in rich or lean conditions. In these systems, NO$_2$ may emitted at a concentration of less than XXX downstream of the cold part of the exhaust line, or may be absent from the exhaust emissions downstream of the cold part of the exhaust line. The systems of the present disclosure are not limited and are applicable to any engine exhaust, including emissions from diesel, gasoline, natural gas engines. The systems may also be used in the exhaust line of any vehicle including any conventional or hybrid vehicles.

As further illustrated in FIG. 1, in the system 100 of the present disclosure, the ozone generation system 105 may include an ozonizer 106 and a controller 112. The ozonizer may include any type of ozonizer known such as ozonizers having a power supply and electrodes, generating ozone from an oxygen-containing gas flow and an electric discharge between the electrodes converting the oxygen into ozone.

Further, the system 100 may include a detector 110 detecting the amount of NO in the exhaust line downstream of the particulate filter 104 such that the controller 112 may regulate the concentration of ozone generated based on the concentration of NO. The ozone may be generated in a concentration sufficient to oxidize NO into $NO_2$ at a conversion rate of at least 80%. The ozone generated by the ozonizer 106 may then be injected via an injection conduit 108 into a mixing chamber 114 receiving the tailpipe emissions from the exhaust line 102 downstream of the particulate filter 104, but close to the end of the exhaust line to have low temperature and avoid quick ozone decomposition.

More particularly, the controller 112 may calculate the amount of ozone needed to oxidize NO into $NO_2$ from the detected value of NOx in the tailpipes emissions from the NOx detector 110. The controller 112 may then regulate the operating conditions of the ozone generation system 105 (such as voltage of the power supply) so that the amount of ozone generated from the ozonizer 106 is sufficient to oxidize the NO from the tailpipe emissions.

The instantaneous concentration of NO in the tailpipe emissions downstream of the particulate filter may be in range of 0 to 2500 ppm with an engine that generate a lot of NOx, but more generally the range is 0 to 1000 ppm. With an very efficient low temperature catalyst 103 and/or a heating system for the cold start, the instantaneous concentration of NO may be below 500 ppm.

The concentration or amount of ozone injected in the mixture of residual pollutants from the tailpipe emissions may be in range of from about 250 to about 2500 ppm.

The ozone generated by the ozonizer may react with CO, NO, and hydrocarbons contained in the tailpipe emissions according to the following equations (Eqs. 1-4).

$$NO + O_3 \rightarrow NO_2 + O_2 \qquad \text{Eq. 1}$$

$$CO + O_3 \rightarrow CO_2 + O_2 \qquad \text{Eq. 2}$$

$$C_2H_4 + 2O_3 \rightarrow 2CO_2 + 2H_2O \qquad \text{Eq. 3}$$

$$C_7H_8 + 6O_3 \rightarrow 7CO_2 + 4H_2O \qquad \text{Eq. 4}$$

The reactions of ozone with $C_2H_4$ and $C_7H_8$ are given as examples of oxidation of hydrocarbons and are not limiting as many other hydrocarbons that may be present in the exhaust gas as unburnt hydrocarbons may also react with ozone to form $CO_2$ and $H_2O$.

The systems of the present disclosure may also include detectors detecting the concentration of CO and hydrocarbons in the tailpipe emissions. In one or more embodiments of the present disclosure, the controller may be further adapted to calculate the concentration of ozone required to oxidize NO, CO, and hydrocarbons present in the exhaust gas in accordance with the above equations.

The instantaneous concentration of CO in the tailpipe emissions downstream of the particulate filter may be in range of 0 to 35,000 ppm. With an very efficient low temperature catalyst 103 and/or a heating system for the cold start, the instantaneous concentration of CO may be below 5,000 ppm The instantaneous concentration of hydrocarbons in the tailpipe emissions downstream of the particulate filter may be in range of 0 to 7500 ppm. With an very efficient low temperature catalyst 103 and/or a heating system for the cold start, the instantaneous concentration of hydrocarbons may be below 2,500 ppm The systems of the present disclosure may also include one or more catalysts. One or more reduction catalysts may be located within the exhaust line downstream of the engine and upstream of the particulate filter for the reduction of hydrocarbons and CO. One or more oxidation catalysts may be located within the exhaust line downstream of the mixing chamber where ozone injection takes place. The oxidation catalysts may include manganese dioxide ($MnO_2$) and may oxidize residual pollutants CO and NO into $CO_2$ and $NO_2$, respectively. $MnO_2$ catalyst is supported on monolith. A washcoat containing alumina is first deposited on the support and dried. The support with the washcoat is then impregnated with manganese salts (wet impregnation). Others metals transition salts can be also added to improve efficiency of $MnO_2$ catalyst. For example, copper, nickel, iron or cerium salts can be used. Finally a calcination under air flow is made at about 300 to about 500° C. to obtain the oxide forms. The $MnO_2$ catalyst may also oxidize hydrocarbons into $CO_2$ and $H_2O$. More particularly, as illustrated in FIG. 1, an $MnO_2$ catalyst 116 may be placed after the introduction of ozone in the mixing chamber 114 to help improving the conversion of pollutants into $CO_2$ (for hydrocarbons and CO) and $NO_2$ (for NO). This oxidation catalyst also allows for a total decomposition of the ozone thus avoiding ozone emission in the atmosphere. A conversion rate of at least 99% is observed when the quantity of $MnO_2$ catalyst is sufficient for total ozone decomposition. On the surface of this $MnO_2$ catalyst, ozone may react according to the following equation (Eq. 5):

$$O_3 \rightarrow O^* + O_2 \qquad \text{Eq. 5}$$

Surface active oxygen may react with residual pollutants of the tailpipe emissions according to the following Equations (Eqs. 6-8):

$$CO + O^* \rightarrow CO_2 \qquad \text{Eq. 6}$$

$$NO + O^* \rightarrow NO_2 \qquad \text{Eq. 7}$$

$$C_xH_y + 2x + \frac{y}{2}O^* \rightarrow xCO_2 + \frac{y}{2}H_2O \qquad \text{Eq. 8}$$

Figure 2A:
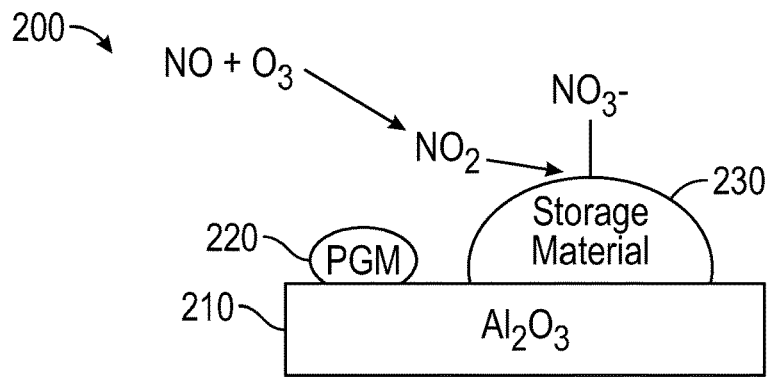
FIGS. 2A and 2B are schematic diagrams illustrating the use (FIG. 2A) and regeneration (FIG. 2B) of an LNT catalyst in accordance with one or more embodiments.
Figure 2B:
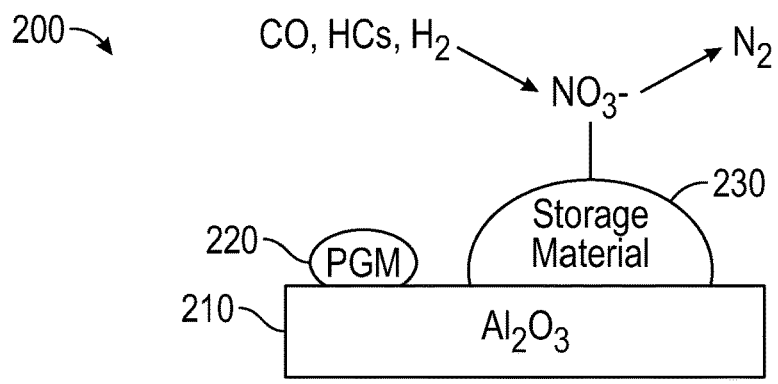

In one or more embodiments, the systems of the present disclosure may also include an LNT catalyst. As illustrated in FIGS. 2A and 2B, the LNT catalyst 200 may comprise a support material 210 such as alumina ($Al_2O_3$), on which are provided a precious metal catalyst 220 comprising one or more precious metals from the platinum group and including, for example, platinum (Pt), palladium (Pd), and/or rhodium (Rh), and a storage material 230 comprising barium. The LNT catalyst is capable of adsorbing or storing $NO_2$ at a storage efficiency of at least about 80% at temperatures of from about 20° C. to about 150° C., while NO is not adsorbed or stored by the LNT catalyst at these low temperatures.

According to the systems of the present disclosure, as illustrated in FIG. 2A, during lean conditions, ozone is generated to oxidize NO to $NO_2$, which is then be adsorbed onto the LNT catalyst in the form of nitrates ($NO_3^-$). Additionally, the $MnO_2$ catalyst allows the conversion of ozone ($O_3$) into oxygen ($O_2$) and surface active oxygen. These surface active oxygen react with residual NO to form $NO_2$, which is then adsorbed onto the LNT catalyst in form of nitrates. As illustrated in FIG. 2B, during rich conditions where LNT is rich in nitrates adsorbed onto the surface, the LNT catalyst may be regenerated by discontinuing ozone generation, at which time, CO, hydrocarbons or $H_2$, which have not been oxidized upon the discontinuation of ozone generation, may reduce the nitrates ($NO_3^-$) formed from the adsorption of $NO_2$ onto the LNT catalyst into nitrogen gas ($N_2$), which is emitted in the atmosphere. The system may include a detector detecting the amount of CO in the exhaust line downstream of the particulate filter. When CO concentration is high and NO concentration is low, the ozone generation can be stopped to allow nitrate reduction into $N_2$ from about 300 to about 350° C. And an hydrogen tank may be also added to the system, hydrogen can be injected when the LNT is saturated at 70% to reduce nitrates into $N_2$ from about 150 to about 200° C.

Figure 3:
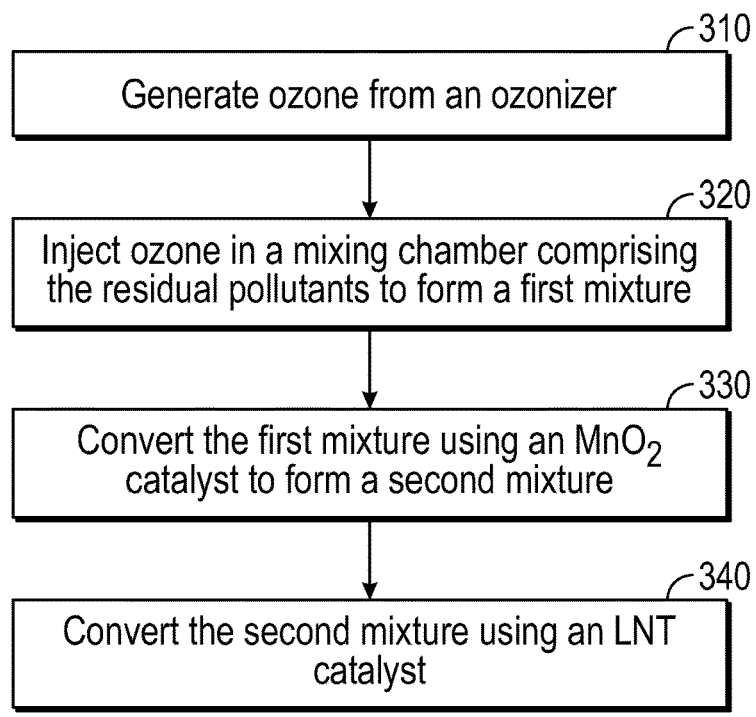
FIG. 3 is a flowchart describing a method for reducing the content of residual pollutants comprising NO, CO, and hydrocarbons from tailpipes emissions in an exhaust line having a cold part in accordance with one or more embodiments

Methods in accordance with one or more embodiments of the present disclosure may be used to treat residual pollutants comprising NO, CO, and hydrocarbons from tailpipe emissions in an exhaust line having a cold part. A method in accordance with one or more embodiments of the present disclosure is depicted by, and discussed with reference to, FIG. 3.

Specifically, in step 310, ozone may be generated from an ozonizer. In step 320, the ozone may be injected in a mixing chamber comprising residual pollutants to form a first mixture. These residual pollutants may include NO, CO, and hydrocarbons and the resulting first mixture may thus contain ozone NO, CO, and hydrocarbons as well as reaction products of these residual pollutants with ozone, such as $NO_2$ and $CO_2$. In step 330, the first mixture may be converted using an $MnO_2$ catalyst to form a second mixture. In step 340, the second mixture may be converted using an LNT catalyst. In this method, the ozone, $MnO_2$ catalyst, and LNT catalyst are provided in the cold part of the exhaust line and the residuals pollutants are oxidized at temperatures of from about 20° C. to about 150° C. in rich or lean conditions. In these methods, $NO_2$ may emitted at a concentration of less than 0.1 mg/km downstream of the cold part of the exhaust line, or may be absent from the exhaust emissions downstream of the cold part of the exhaust line.

The methods according to the present disclosure may also include a step of detecting 110 detecting the concentration of NO in the tailpipes emissions in the exhaust line with a detector. In one or more embodiments, the methods may include regulating the concentration of ozone generated by the ozonizer based on the concentration of NO that is detected from the tailpipes emissions. In these methods, the ozone may be generated and injected in the mixing chamber at a concentration of 1000 ppm allowing for the oxidation of NO into $NO_2$ at a conversion rate of at least 80%.

In the methods according to the present disclosure, a controller may regulate the amount or concentration of ozone needed to oxidize NO into $NO_2$ from the detected value of NOx in the tailpipes emissions. The operating conditions of the ozone generation system (such as voltage of the power supply) may be regulated by the controller so that the amount of ozone generated from the ozonizer is sufficient to oxidize the NO from the tailpipe emissions.

In the methods of the present disclosure, the instantaneous concentration or amount of CO in the tailpipe emissions downstream of the particulate filter may be in range of 0 to 35,000 ppm. The instantaneous concentration or amount of hydrocarbons in the tailpipe emissions downstream of the particulate filter may be in range of 0 to 7,500 ppm.

According to the present disclosure, in order to reduce the NOx concentration in an exhaust gas, the methods may include adsorbing or storing, on an LNT catalyst, $NO_2$ formed from the oxidations by ozone and via the $MnO_2$ catalyst. Unlike NO, $NO_2$ is easily stored on the LNT catalyst even at a low temperature. The method according to one or more embodiments include adding an appropriate amount or concentration of ozone to exhaust gas to convert NO to $NO_2$, and then adsorbing or storing it on the LNT catalyst in the form of nitrates.

More particularly, the method may include placing the LNT catalyst in an exhaust line downstream of the mixing chamber and the $MnO_2$ catalyst. The LNT catalyst may be used in lean or rich conditions. The LNT may be exposed to the exhaust gases such that at least a portion of the $NO_x$ in the gas is converted to $N_2$, preferably at a temperature between about 125° C. and 700° C.

The LNT used in the methods of the present disclosure may have a storage efficiency of at least about 80% at a temperature in a range of from about 20° C. to about 150° C.

$NO_2$ storage is better for a BaO content around 15 to 25 wt %. The $NO_2$ storage may be about 30 to about 60 mg/g from about 20° C. to about 150° C. 0.5 to 1 wt % of PGM is sufficient for nitrites reduction or pollutant conversion at high temperatures, such as temperatures of about 250 to 300° C.

EXAMPLES

The following examples are merely illustrative and should not be interpreted as limiting the scope of the present disclosure.

As example, Ozonation/LNT coupling during cold start, with 1000 ppm $O_3$, allowed the conversion of at least 80% of NO into $NO_2$ and at least 80% of hydrocarbons of the exhaust. In this case, $NO_2$ was totally adsorbed on LNT. This performance was observed up to 150° C., which significantly reduces cold emissions. Barium and potassium were the alkali materials observed with the largest NOx storage capacities, but potassium was difficult to stabilize in the presence of water. Barium was therefore the privileged material. Others alkali materials were used with barium (Sr or Ca for example). In particular, the ratio 2:1 for Ba:Sr or Ba:Ca showed interesting results with the ageing of LNT.

While only a limited number of embodiments have been described, those skilled in the art, having benefit of this disclosure, will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A system for reducing the content of residual pollutants comprising NO, CO, and hydrocarbons from tailpipes emissions in an exhaust line having a cold part, the system comprising:
   an ozone generation system;
   an $MnO_2$ catalyst; and
   a lean $NO_x$ trap (LNT) catalyst comprising a precious metal catalyst, a storage material, and a support material, wherein the storage material comprises 15 to 25 wt % barium oxide (BaO), and the support material comprises alumina ($Al_2O_3$);
   wherein the ozone, $MnO_2$ catalyst, and LNT catalyst are provided in the cold part of the exhaust line such that the system is operational to oxidize the residual pollutants to an emission mixture comprising $NO_2$, $CO_2$, and $H_2O$ in the cold part of the exhaust line in rich or lean conditions;
   wherein the cold part of the exhaust line has a temperature of from about 20° C. to about 150° C., and
   wherein the emission mixture has an $NO_2$ concentration of less than 0.1 mg/km.

2. The system of claim 1, wherein the ozone generation system comprises an ozonizer generating ozone from oxygen and a controller.

3. The system of claim 2, further comprising a detector detecting the concentration of NO in the tailpipes emissions in the exhaust line, wherein the controller regulates the concentration of ozone generated by the ozonizer based on the concentration of NO.

4. The system of claim 3, wherein the ozone generation system injects ozone in a mixing chamber at a concentration of from about 250 to about 2500 ppm such that the ozone oxidizes NO into $NO_2$ at a conversion rate of at least 80%.

5. The system of claim 1, wherein the cold part of the exhaust line has a temperature of from about 25° C. to about 100° C.

6. The system of claim 1, wherein the precious metal catalyst comprises one or more precious metals selected from the group consisting of platinum (Pt), palladium (Pd), and rhodium (Rh).

7. A method of treating residual pollutants comprising NO, CO, and hydrocarbons from tailpipes emissions in an exhaust line having a cold part, the method comprising:
   generating ozone from an ozonizer;
   injecting the ozone in a mixing chamber comprising the residual pollutants to form a first mixture;
   converting the first mixture using an $MnO_2$ catalyst to form a second mixture; and
   converting the second mixture using an LNT catalyst to an emission mixture comprising $NO_2$, $CO_2$, and $H_2O$,
   wherein the LNT catalyst comprises a precious metal catalyst, a storage material, and a support material, wherein the storage material comprises 15 to 25 wt % barium oxide (BaO), and the support material comprises alumina ($Al_2O_3$);
   wherein the ozone, $MnO_2$ catalyst, and LNT catalyst are provided in the cold part of the exhaust line such that the residual pollutants are oxidized in the cold part of the exhaust line in rich or lean conditions;
   wherein the cold part of the exhaust line has a temperature of from about 20° C. to about 150° C.; and
   wherein the emission mixture has an $NO_2$ concentration of less than 0.1 mg/km.

8. The method of claim 7, further comprising detecting the concentration of NO in the tailpipes emissions in the exhaust line with a detector.

9. The method of claim 7, further comprising regulating the concentration of ozone generated by the ozonizer based on the concentration of NO.

10. The method of claim 9, wherein ozone is generated at a concentration of from about 250 to about 2500 ppm, and wherein the ozone oxidizes NO into $NO_2$ at a conversion rate of at least 80%.

11. The method of claim 7, wherein the cold part of the exhaust line has a temperature of from about 25° C. to about 100° C.

12. The method of claim 7, wherein the precious metal catalyst comprises one or more precious metals selected from the group consisting of platinum (Pt), palladium (Pd), and rhodium (Rh).

* * * * *